April 28, 1964 R. H. E. ROCHMAN 3,130,936

DIGITAL RECORDING TAPE TRANSPORT DAMPING SYSTEM

Filed April 26, 1961 2 Sheets-Sheet 1

INVENTOR.
RICHARD H.E. ROCHMAN
BY Alfred W. Barber
ATTORNEY

April 28, 1964 R. H. E. ROCHMAN 3,130,936

DIGITAL RECORDING TAPE TRANSPORT DAMPING SYSTEM

Filed April 26, 1961 2 Sheets-Sheet 2

*INVENTOR.*

RICHARD H. E. ROCHMAN

*BY* Alfred W. Barber

ATTORNEY

3,130,936
DIGITAL RECORDING TAPE TRANSPORT DAMPING SYSTEM

Richard H. E. Rochman, Huntington Station, N.Y., assignor to Potter Instrument Company, Inc., Plainview, N.Y., a corporation of New York Filed Apr. 26, 1961, Ser. No. 105,785
5 Claims. (Cl. 242—75.3)

The present invention concerns tape transports and, in particular, methods of and means for reducing undesired vibrations in tension arms and pinch rollers in such devices.

In digital recording systems utilizing plastic tape as the recording medium, highly refined systems have been devised for programming the tape. Such systems are required to move the recording tape past a record/playback head under precise control of speed. Such system are also called on to start and stop the motion of the tape at very high rates of acceleration and deceleration. In accomplishing this programming of the tape the starting, stopping and tensioning devices utilized are called on to respond quick, definitely and often with considerable force. Two commonly used components in a sophisticated tape handling system capable of high performance include tension arms for tensioning and pinch rollers for coupling the tape to the driving capstans. The tape in such a system passes between two take-up reels over a path including at least two tension arms, two drive capstans (one for each direction), and the record/playback head. Under conditions of constant tape speed, one of the pinch rollers presses the tape against its drive capstan to pull the tape over the record/playback head and the tension arms assume a more or less stable position. The position of the tension arms will generally be used through a servo system to control the take-up reels so that under steady motion conditions they will be biased in such directions as to provide the required take-up reel motion and to still provide a substantially predetermined tension on the tape.

Now, when a command is given to stop the tape motion, the pinch roll moves away from the capstan removing the driving force from the tape and the tape suddenly stops moving. However, tape is being fed to one tension arm and is being pulled from the other by the motion of the take-up reels. The servo system commands the reels to stop and the tension arms are suddenly brought to rest. When a new command is given to start the motion of the tape, one of the pinch rollers is suddenly brought down on the tape and drive capstan starting the tape motion and reversing the conditions for the tension arms and take-up reels. It has been observed that under operating conditions when stopping and starting is carried out in rapid succession that conditions may develop where the tension arms and pinch rollers tend to bounce and oscillate. This bouncing and oscillation tends to upset the smooth transition in tape speed from stop to start and vice versa. The trouble shows up mainly as a tensional shock wave along the tape in the form of rapid oscillations in speed between the time of a start command and the final steady state of the moving tape.

It has been found, according to the present invention, that damping means may be applied to the tension arms and pinch rollers which substantially overcome this tendency to bounce and oscillate. One specific damping system found to be effective for the purposes of the present invention consists in a damped oscillatory means coupled to the tension arms and pinch rollers and tuned to the natural frequency of each. It has been found that if the coupled mass is considerably smaller than the main mass being damped, the resultant reduction in oscillatory amplitude of the main mass may be maximized. The final maximizing of the reduction in amplitude of oscillation of the mass being damped may be accomplished by choosing the optimum damping of the coupled mass. It has been found that if a coupled mass of the order of 10 percent of the main mass is used, and the damping is adjusted for minimum residual motion of the main mass a substantially optimum reduction of oscillatory motion of the tension arms or pinch rollers may be achieved.

Accordingly one object of the present invention is to provide methods of and means for substantially reducing bounce and oscillatory vibrations in tension arms, pinch rollers and the like in tape handling systems.

Another object is to reduce oscillatory vibrations in tape handler tension arms, pinch rollers and the like without substantially changing their normal program response.

Still another object is to optimize the reduction of oscillatory vibration in the tension arms and pinch rollers of tape handling devices.

These and other objects of the present invention will be apparent from the detailed description of the invention given in connection with various figures of the drawings.

Figure 1:
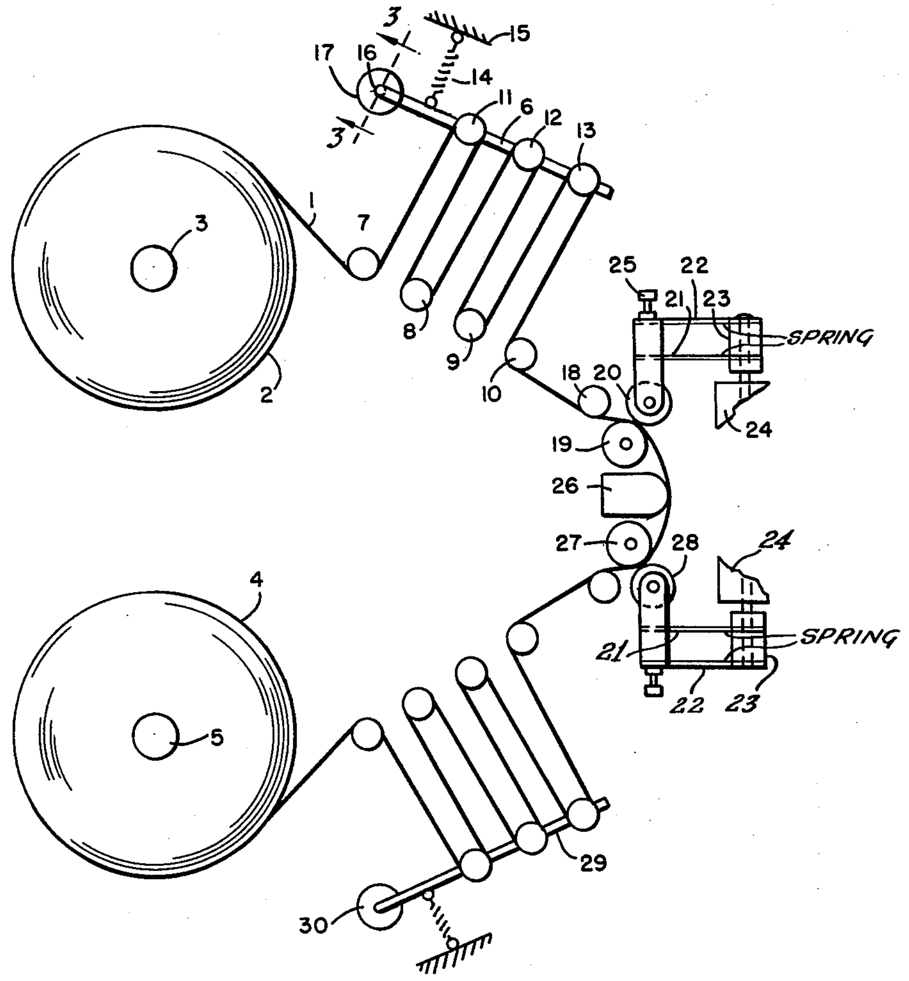
FIGURE 1 is a diagrammatic representation of the essential elements of a tape handler embodying one form of the present invention.

FIG. 1 shows a tape 1 passing from take-up reel 2 mounted on shaft 3 and turned by conventional servo controlled motor means not shown, to take-up reel 4 mounted on shaft 5, also turned by conventional servo controlled motor means not shown. The path of tape 1 is over fixed position rollers 7, 8, 9 and 10 and rollers 11, 12 and 13 carried by tension arm 6, under guide roller 18 between drive capstan 19 and pinch roller 20, across record/playback head 26, between drive capstan 27 and pinch roller 28, and over fixed position and movable rollers associated with tension arm 29. Tension arm 6 is pivoted at 16 and has a spring bias provided by spring 14 returned to frame member 15. Tension arm 29 is similarly pivoted and spring loaded. Tension arm 6 is provided with an axially connected damped resonator 17 for reducing to a minimum any tendency to vibrate due to mechanical resonance. Tension arm 29 is similarly provided with damped resonator 30. These resonators are shown in detail in FIGS. 2 and 3 to be described below. Pinch roller 20 is suspended by a leaf spring 22 spaced and mounted on frame member 24 by spacer and bolt 23 and is brought into operative pressure against tape 1 and capstan 19 by an armature on spring 21, such as better seen as armature 50 in FIG. 4, energized by suitable coil means not shown. Capstan 19 is normally in continuous rotation being driven by suitable motor means not shown. Pinch roller 20 is connected to a damped resonator 25 for substantially reducing oscillatory vibrations of its main mass. Pinch roller 28 provided for cooperating with capstan 27 for driving in the opposite direction is similarly provided. Details of the pinch roll damping device are shown in FIGS. 4, 5 and 6 described below.

Figure 2:
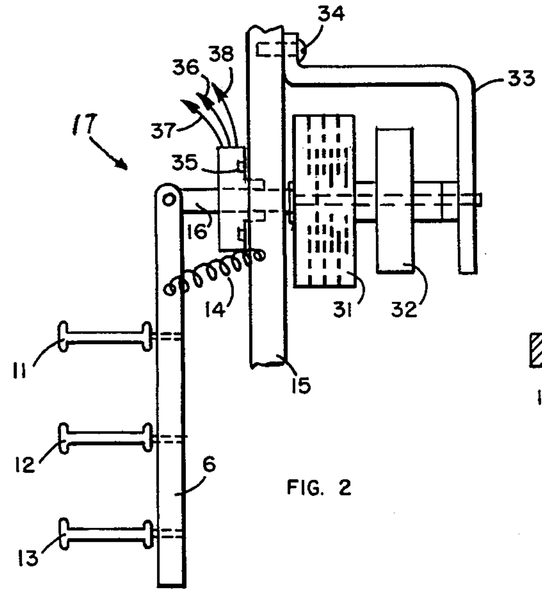
FIGURE 2 is a diagrammatic representation of one form of the present invention as applied to a tension arm.

FIG. 2 shows tension arm 6 with its guide rollers 11, 12, and 13 carried by and pivoting around shaft 16 in response to the pull of the tape (not shown) and tension spring 14 returned to frame 15. Shaft 16 operates servo control potentiometer 35 connected to servo reel control circuit means over leads 36, 37 and 38 at a point close to arm 6 so that the potentiometer movements will closely follow the motion of arm 6 and hence provide stiff control to the servo system. Shaft 16 passes through wall 15 and into the resonant damping system including flywheel 32 and viscous damping means carried in chamber 31 to an end support in suitable means such as bracket 33 held to frame 15 by mounting screw 34. The details of the resonant damping system of FIG. 2 are shown in FIG. 3.

Figure 3:
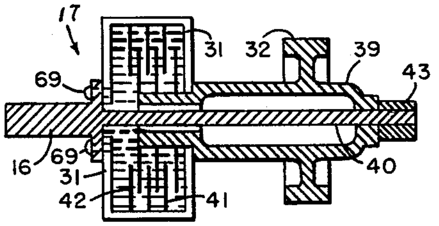
FIGURE 3 is a cross-sectional view taken on line 3—3 of FIG. 1 of a portion of the device of FIG. 2.

FIG. 3 is a cross-sectional view of one form of resonant damper suitable for use on a tension arm as taken along line 3—3 of FIG. 1. Tension arm shaft 16 becomes or is suitably fastened to a torsion bar 40 which in turn is fastened to outer hollow shaft 39 carrying flywheel 32 and damping vanes 41 which being located within viscous fluid filled chambers 31 act with stationary vanes 42 to damp the motion of flywheel 32. Chamber 31 is secured by suitable means such as rivets 69 to shaft 16 so that it is rigidly carried by the mass to be damped. The assembly includes a bearing hub 43 to be supported in the end bearing support 33 of FIG. 2. It will be seen that the elasticity of torsion bar 40 and the mass of flywheel 32 constitute a mechanical resonant system. This resonant system is damped by vanes 41 and 42 in the viscous fluid in chamber 31 and is coupled to the tension arm over shaft 16. It has been found that if the resonance of torsion bar 40 and flywheel 32 is made to occur at the same frequency as the mechanical resonance of the mass of tension arm 6 acting with the elasticity of spring 14 that any tendency of tension arm 6 to vibrate at this resonant frequency is greatly reduced. This reduction in resonant vibration of arm 6 is particularly effective when the mass of flywheel 32 is much smaller than the mass of arm 6 and is even further reduced with the proper damping by vanes 41 and 42. For example, the mass of flywheel 32 may be made of the order of 10 percent of the mass of tension arm 6 (including its rollers and attached masses). The damping of the vanes 41 and 42 may be varied until minimum residual resonant vibration amplitude of tension arm 6 remains by varying the viscosity of the fluid in chamber 31, varying the size and spacing of vanes 41 and 42 or by other well known means.

Figure 4:
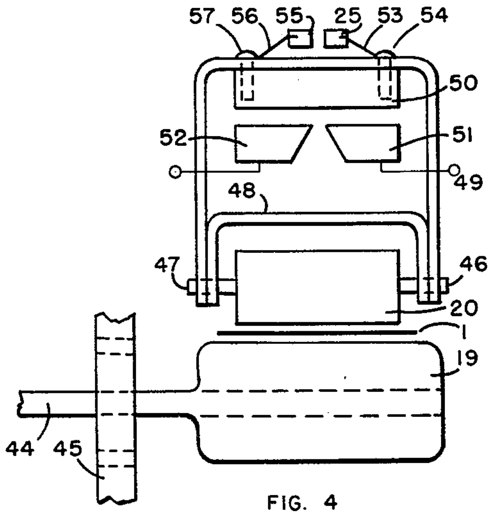
FIGURE 4 is a diagrammatic representation of another form of the present invention applied to a pinch roller.
Figure 5:
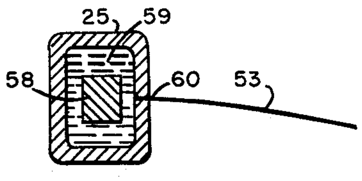
FIGURE 5 is a cross-sectional view of one form of damping device as seen in FIG. 4.
Figure 6:
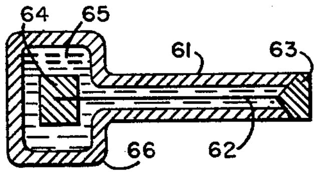
FIGURE 6 is a cross-sectional view of an alternate to the device of FIG. 5.

This same resonant damping may be applied to the pinch rollers as shown in FIGS. 4, 5 and 6. Referring to FIG. 1 it will be seen that the mass of pinch roller 20 together with its mounting yoke on spring 22 in combination with the elasticity of spring 22 acts as a mechanical resonant system having a predetermined natural frequency. When pinch roller 20 is moved suddenly toward or away from capstan 19, it will tend to oscillate at or near this natural frequency. It has been found in accordance with the present invention that this oscillating tendency may be greatly reduced without otherwise materially affecting the dynamics of the system by coupling the pinch roller to a smaller damped mechanical oscillatory system resonant at substantially the same frequency. Suitable coupled masses are shown at 25 in FIG. 1 and at 25 and 55 in FIG. 4.

FIG. 4 shows capstan 19 carried in a suitable bearing in frame 45 is rotated by suitable means, not shown, over shaft 44. Tape 1 to be moved by capstan 19 is pinched to capstan 19 by pressure from pinch roller 20. Pinch roller 20 is carried by yoke 49 on bearings 46 and 47. Yoke 49 carries armature 50 to which it is secured by fasteners 54 and 57 and may be reenforced by a secondary yoke 48. Armature 50 is pulled down by electromagnets 51—52 upon command to pinch the tape causing it to be drawn forward by capstan 19. (The spring mounting 22 of this pinch roller, yoke and armature is seen in FIG. 1.) Resonant damping means for this resonant pinch roller is provided by weights 25 and 55 mounted on leaf springs 53 and 56 respectively which in turn are secured to yoke 49 by fasteners 54 and 57 respectively. These masses, as in the case of the tension arms, may be of the order of 10 percent of the main mass to be damped, i.e. the total sprung mass of the pinch roller, yoke and armature. The resonant frequency of the damping weights and springs should be substantially the same as that of the main mass. Damping of the resonant dampers may be supplied in any suitable manner as by the means shown in cross-section in FIG. 5.

FIG. 5 shows weight 25 consisting of a closed chamber containing a weight 58 moving in a viscous medium 59 contained within the chamber. The amount of damping so provided may be varied by varying the viscosity of the damping fluid, relative size of the free weight and the enclosed space or by other well known means. Spring 53 is secured to chamber 25 at 60.

FIG. 6 shows an alternate form of damped resonant vibrator in which the resonant system consists in weight 64 mounted on leaf spring 62 and all contained in a chamber 66 having a neck 61, mounting end 63 and containing a viscous damping fluid 65.

As in the case of the resonant damping system applied to the tension arms, the minimum resultant amplitude of resonant vibration of the pinch roller may be secured by adjustment of the amount of damping of the auxiliary resonant system. Since no damping is applied to the main mass, i.e. the tension arm or the pinch roller to secure this greatly reduced resonant vibration, the normal modes of operation are not substantially affected. To secure a comparable reduction in resonant vibration by the application of damping to the main mass would seriously affect the normal operation of the system.

Figure 7:
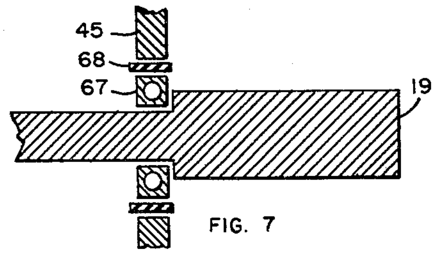
FIGURE 7 is a cross-sectional view of a modified portion of the form of the invention shown in FIG. 4.

FIG. 7 shows a shock mounting applied to the capstan mounting for reducing the impact of the pinch roller on the capstan. Capstan 19 is mounted in a ball bearing 67. This ball bearing is mounted in frame 45 by means of an intermediate layer of elastic material such as rubber gasket 68. When the pinch roller strikes capstan 19, capstan 19 gives slightly due to the elastic mounting lessening the impact and because the elastic mounting is loose, it returns only part of the impact force to the pinch roller thus dampening the vibration.

The damping system applied to the tension arm has been shown as an axial device while that applied to the pinch roller might be termed a pendulum type device. While these are the preferred forms, other forms of resonant damping may be used. For example, a pendulum type of damper may be applied to the tension arm or an axial device to the pinch roller.

While only a few variations of the present invention have been shown and described, many modifications will be apparent to those skilled in the art and within the spirit and scope of the invention as set forth in particular in the appended claims.

What is claimed is:

1. In a high speed tape transport for digital recording and the like, the combination of, means for passing recording tape from a first take-up reel to a second take-up reel along a path passing across a record/play-back head and over at least one tension arm, and damping means connected with the tension arm, said damping means comprising means connected with the tension arm to provide an elastic restoring force constituting together with the mass of the arm a mechanically resonant system and including a second resonant system coupled to said arm of substantially less mass than said tension arm and tuned to substantially the same frequency as the resonant frequency of said arm and its restoring force, and viscous damping means coupled to said second resonant system.

2. In a high speed tape transport for digital recording or the like, the combination of, means for passing recording tape from a first take-up reel to a second take-up reel along a path passing across a record/play-back head and under the influence of at least one tape feeding control means including a first resonant device exhibiting mechanical resonance at a frequency determined by its mass and restoring force, a second resonant device of substantially smaller mass than the first said device and coupled thereto, and damping means coupled to said second resonant device so that the second resonant device is resonant at substantially the same frequency as the first resonant device.

3. A high speed tape handler as set forth in claim 2 in which the first said resonant device is a tension arm.

4. A high speed tape handler as set forth in claim 2 in which the said smaller mass is coupled by a torsion bar to the first said mass.

5. In a high speed tape handler as set forth in claim 2 in which said damping means is viscous.

References Cited in the file of this patent

UNITED STATES PATENTS

| | | |
|---|---|---|
| 1,892,554 | Kellogg | Dec. 27, 1932 |
| 2,267,107 | Juillard | Dec. 23, 1941 |
| 2,678,173 | Phelps | May 11, 1954 |
| 2,685,417 | Bartelson | Aug. 3, 1954 |
| 2,750,128 | Hittle | June 12, 1956 |